3,773,827
AMINONAPHTHALENE-SULPHONIC ACIDS
Karl-Heinz Schündehütte, Opladen, Germany, assignor to Bayer Aktiengesellschaft, Leverkusen, Germany
No Drawing. Filed Nov. 19, 1969, Ser. No. 878,236
Claims priority, application Germany, Nov. 22, 1968,
P 18 10 279.9
Int. Cl. C07c 143/56
U.S. Cl. 260—508   1 Claim

ABSTRACT OF THE DISCLOSURE

Aminonaphthalene sulphonic acids of the formula

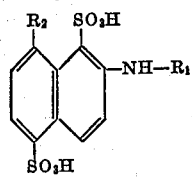

wherein $R_1$ stands for hydrogen and acyl radical, $R_2$ denotes the grouping $NO_2$, $NH_2$ or $OH$. The compounds are useful for the production of azo-dyestuffs.

---

The subject-matter of the invention comprises aminonaphthalene-sulphonic acids of the Formula I and processes for their production

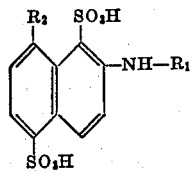

(I)

In this formula $R_1$ stands for hydrogen or an acyl radical, $R_2$ denotes the grouping $-NO_2$, $-NH_2$ or $-OH$.

The acyl radicals $R_1$ present can be the radicals of saturated or unsaturated, open-chain or cyclic, substituted or unsubstituted aliphatic carboxylic acids and sulphonic acids; the radicals of mono- or polynuclear, substituted or unsubstituted aromatic carboxylic acids and sulphonic acids; the radicals of mono- or polynuclear, substituted or unsubstituted heterocyclic carboxylic and sulphonic acids; heterocyclic acyl radicals such as azinyl radicals, e.g. monazine, diazine and triazine radicals; as well as the radicals of carbonic acid and its derivatives.

The following acyl radicals are given as examples: formyl, acetyl, propionyl, butyryl, isobutyryl, valeryl, isovaleryl, pivaloyl, hexanoyl, heptanoyl, octanoyl, nonanoyl, decanoyl, lauroyl, myristoyl, palmitoyl, stearoyl, mono-, di- or trihalocetyl, halopropionyl, sulphonylpropionyl, halo-acryloyl, butadienoyl, pyruvoyl, acetoacetyl, 3-acetyl-propionyl, β-(1-methyl)-imidazolium-propionyl, methacryloyl, crotyl, sorbinoyl, oleoyl, linoloyl, methoxy- or amino-acetyl, oxaloyl, methoxalyl, ethoxalyl, malonoyl, carbethoxy-acetyl, succinoyl, halosuccinoyl, glutaroyl, adipoyl, sebacinoyl, maleoyl, fumaroyl, itaconoyl, teraconoyl, cyclopentane-carbonyl, cyclopentene-carbonyl, cyclopentadienoyl, cyclohexane-carbonyl, cyclohexene-carbonyl, cyclohexadienoyl, lactoyl, phenylacetyl, benziloyl, phenylpropionyl, cinnamoyl, methane-sulphonyl, ethane-sulphonyl, β-chloroethane-sulphonyl, vinylsulphonyl, benzoyl, halobenzoyl, nitrobenzoyl; lower alkylbenzoyl such as toluoyl, salicyloyl, lower alkyl-thiobenzoyl, lower alkoxybenzoyl such as anisoyl, cyanobenzoyl, nitro-fluoro-benzoyl, nitro-chloro-benzoyl or nitro-bromobenzoyl, galloyl, sulphobenzoyl, phenylbenzoyl, aminobenzoyl, acyl-aminobenzoyl such as formylamino-, acetylamino-, chloro- and bromoacetylamino-, oxalylamino- and benzoylamino-benzoyl, the 4-nitro-biphenyl-carboxylic acid-(4)-radical, naphthoyl, hydroxynaphthoyl, anthracenoyl, hydroxy-anthracenoyl, anthraquinone-carboxylic acid radicals, benzene-sulphonyl, toluene-sulphonyl, nitrobenzene-sulphonyl, chlorobenzene-sulphonyl; furthermore furoyl, thenoyl, oxazole-, thiazole-, isothiazole- or imidazole-carbonyl and -sulphonyl, such as 2-chlorothiazole-carbonyl, optionally substituted lower 2-alkylsulphonyl-thiazole-carbonyl, 2-fluorothiazole-carbonyl, 3,5-dichloroisothiazole-carbonyl, benzothiazole-carbonyl e.g. 2-fluoro-benzothiazole-carbonyl, 2-chlorobenzothiazole-carbonyl or 2-alkyl- or arylsulphonyl-benzothiazole-carbonyl; pyridine-carbonyl such as nicotinoyl, 2,6-bis-methylsulphonyl-pyridine-4-carbonyl or 2-chloro-pyridine-5-carbonyl, quinoline-carbonyl, isoquinoline-carbonyl; pyrimidine-carbonyl such as 2,4-dichloropyrimidine-5- or -6-carbonyl; phthalazine-carbonyl or -sulphonyl, quinoxaline-carbonyl or -sulphonyl such as 2,3-dichloroquinoxaline-6-carbonyl. Further individual examples are mono- or dihalo-sym.-triazinyl radicals, e.g. 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propyl-amino-4-chlorotriazinyl-6, 2-β-hydroxyethylamino-4-chlorotriazinyl-6, 2-di-β-hydroxyethylamino-4-chlorotriazinyl-6 and the corresponding sulphuric acid semi-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino and subst. arylamino-4-chlorotriazinyl-6, such as 2-phenylamino-4-chlorotriazinyl-6, 2-(o, m- or p-carboxy- or sulphophenyl)-amino-4-chlorotriazinyl-6, 2-alkoxy-4-chlorotriazinyl-6, such as 2-methoxy- or -ethoxy-4-chlorotriazinyl-6, 2-(phenylsulphonylmethoxy)-4-chlorotriazinyl-6, 2-aryloxy- and subst. aryloxy-4-chlorotriazinyl-6, such as 2-phenoxy-4-chlorotriazinyl-6, 2-(p-sulphophenyl)-oxy-4-chlorotriazinyl-6, 2-(o-, m-, or p-methyl- or methoxyphenyl)-oxy-4-chlorotriazinyl-6, 2-alkyl-mercapto- or 2-arylmercapto- or 2-(subst. aryl)-mercapto-4-chlorotriazinyl-6, such as 2-(β-hydroxyethyl)-mercapto-4-chloro-triazinyl-6, 2-phenylmercapto-4-chlorotriazinyl-6, 2-(4'-methylphenyl)-mercapto-4-chlorotriazinyl-6, 2-(2',4'-dinitro)-phenyl-mercapto-4-chlorotriazinyl-6, 2-methyl-4-chlorotriazinyl-6, 2-phenyl-4-chlorotriazinyl-6, mono-, di- or trihalopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carboalkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl- or -carbonyl, 2- or 3- or 4-(4',5'-dichloropyridazone-6'-yl-1'-)-phenylsulphonyl or -carbonyl, β-(4',5'-dichloropyridazone-6'-yl-1')-ethylcarbonyl, N-methyl-N-(2,4-dichlorotriazinyl-6-)-carbamyl, N-methyl-N-(2-methylamino-4-chlorotriazinyl-6)-carbamyl, N-methyl-N-(2-dimethyl-amino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromo and fluoro derivatives of the aforesaid chloro-substituted heterocyclic radicals, including, for example, 2-fluoro-4-pyrimidinyl,
2,6-difluoro-4-pyrimidinyl, 2,6-difluoro-5-chloro-4-pyrimidinyl,
2-fluoro-5,6-dichloro-4-pyrimidinyl,
2,6-difluoro-5-methyl-4-pyrimidinyl,
2,5-difluoro-6-methyl-4-pyrimidinyl,
2-fluoro-5-methyl-6-chloro-4-pyrimidinyl,
2-fluoro-5-nitro-6-chloro-4-pyrimidinyl,
5-bromo-2-fluoro-4-pyrimidinyl,
2-fluoro-5-cyano-4-pyrimidinyl,
2-fluoro-5-methyl-4-pyrimidinyl,
2,5,6-trifluoro-4-pyrimidinyl,
5-chloro-6-chloromethyl-2-fluoro-4-pyrimidinyl,
2,6-difluoro-5-bromo-4-pyrimidinyl,
2-fluoro-5-bromo-6-methyl-4-pyrimidinyl,
2-fluoro-5-bromo-6-chloromethyl-4-pyrimidinyl,
2,6-difluoro-5-chloromethyl-4-pyrimidinyl,
2,6-difluoro-5-nitro-4-pyrimidinyl,
2-fluoro-6-methyl-4-pyrimidinyl,
2-fluoro-5-chloro-6-methyl-4-pyrimidinyl,
2-fluoro-5-chloro-4-pyrimidinyl,
2-fluoro-6-chloro-4-pyrimidinyl,
6-trifluoromethyl-5-chloro-2-fluoro-4-pyrimidinyl,
6-trifluoromethyl-2-fluoro-4-pyrimidinyl,
2-fluoro-5-nitro-4-pyrimidinyl,
2-fluoro-5-trifluoromethyl-4-pyrimidinyl,
2-fluoro-5-phenyl- or -5-methylsulphonyl-4-pyrimidinyl,
2-fluoro-5-carboxamido-4-pyrimidinyl,
2-fluoro-5-carbomethoxy-4-pyrimidinyl,
2-fluoro-5-bromo-6-trifluoromethyl-4-pyrimidinyl,
2-fluoro-6-carboxamido-4-pyrimidinyl,
2-fluoro-6-carbomethoxy-4-pyrimidinyl,
2-fluoro-6-phenyl-4-pyrimidinyl,
2-fluoro-6-cyano-4-pyrimidinyl,
2,6-difluoro-5-methylsulphonyl-4-pyrimidinyl,
2-fluoro-5-sulphonamido-4-pyrimidinyl,
2-fluoro-5-chloro-6-carbomethoxy-4-pyrimidinyl,
2,6-difluoro-5-trifluoromethyl-4-pyrimidinyl;

triazine radicals containing sulphonyl groups, such as 2,4-bis-(phenylsulphonyl)-triazinyl-6, 2-(3'-carboxyphenyl)-sulphonyl - 4 - chlorotriazinyl-6, 2-(3'-sulphophenyl)-sulphonyl-4-chlorotriazinyl-6, 2,4-bis-(3'-carboxyphenylsulphonyl-1')-triazinyl-6; sulphonyl group-containing pyrimidine rings, such as 2-carboxymethylsulphonyl-pyrimidinyl-4,
2-methylsulphonyl-6-methyl-pyrimidinyl-4,
2-methylsulphonyl-6-ethyl-pyrimidinyl-4,
2-phenylsulphonyl-5-chloro-6-methyl-pyrimidinyl-4,
2,6-bis-methylsulphonyl-pyrimidinyl-4,
2,6-bis-methylsulphonyl-5-chloro-pyrimidinyl-4,
2,4-bis-methylsulphonyl-pyrimidine-5-sulphonyl,
2-methylsulphonyl-pyrimidinyl-4,
2-phenyl-sulphonyl-pyrimidinyl-4,
2-trichloromethylsulphonyl-6-methyl-pyrimidinyl-4,
2-methylsulphonyl-5-chloro-6-methyl-pyrimidinyl-4,
2-methylsulphonyl-5-bromo-6-methyl-pyrimidinyl-4,
2-methylsulphonyl-5-chloro-6-ethyl-pyrimidinyl-4,
2-methylsulphonyl-5-chloro-6-chloro-methyl-pyrimidinyl-4,
2-methylsulphonyl-4-chloro-6-methylpyrimidine-5-sulphonyl,
2-methylsulphonyl-5-nitro-6-methyl-pyrimidinyl-4,
2,5,6-tris-methylsulphonyl-pyrimidinyl-4,
2-methylsulphonyl-5,6-dimethyl-pyrimidinyl-4,
2-ethylsulphonyl-5-chloro-6-methyl-pyrimidinyl-4,
2-methylsulphonyl-6-chloro-pyrimidinyl-4,
2,6-bis-methylsulphonyl-5-chloro-pyrimidinyl-4,
2-methylsulphonyl-6-carboxy-pyrimidinyl-4,
2-methylsulphonyl-5-sulpho-pyrimidinyl-4,
2-methylsulphonyl-6-carbomethoxy-pyrimidinyl-4,
2-methylsulphonyl-5-carboxy-pyrimidinyl-4,
2-methylsulphonyl-5-cyano-6-methoxy-pyrimidinyl-4,
2-methylsulphonyl-5-chloro-pyrimidinyl-4,
2-sulphoethylsulphonyl-6-methyl-pyrimidinyl-4,
2-methylsulphonyl-5-bromo-pyrimidinyl-4,
2-phenylsulphonyl-5-chloro-pyrimidinyl-4,
2-carboxymethylsulphonyl-5-chloro-6-methyl-pyrimidinyl-4,
2-methylsulphonyl-6-chloropyrimidine-4- and -5-carbonyl,
2,6-bis-(methylsulphonyl)-pyrimidine-4- or -5-carbonyl,
2-ethylsulphonyl-6-chloropyrimidine-5-carbonyl,
2,4-bis-(methylsulphonyl)-pyrimidine-5-sulphonyl,
2-methylsulphonyl-4-chloro-6-methyl-pyrimidine-5-sulphonyl or -carbonyl;

ammonium group-containing triazine rings, such as 2-trimethylammonium-4-phenylamino- or -4-(o-, m- or p-sulphophenyl)-aminotriazinyl-6, 2 - (1,1 - dimethylhydrazinium)-4-phenylamino- or -4-(o-, m- or p-sulphophenyl)-aminotriazinyl-6, 2 - (2 - isopropylidene-1,1-dimethyl)-hydrazinium-4-phenylamino- or -4-(o-, m- or p-sulphophenyl)-aminotriazinyl-6, 2-N-aminopyrrolidinium- or 2-N-aminopiperidinium-4-phenyl-amino- or -4-(o-, m- or p-sulphophenyl)-aminotriazinyl-6, furthermore 4-phenylamino- or 4-(sulphophenylamino)-trazinyl-6 radicals, containing in 2-position via a nitrogen bond 1,4-bis-azabicyclo - [2,2,2] - octane or 1,2-bis-aza-bicyclo-[0,3,3]-octane in quaternary linkage, 2-pyridinium-4-phenylamino- or -4-(o-, m- or p-sulphophenyl)-amino-triazinyl-6 and the corresponding 2-onium-triazinyl-6 radicals, substituted in 4-position by alkylamino such as methylamino, ethylamino or β-hydroxyethylamino, or alkoxy such as methoxy or alkoxy, or aroxy such as phenoxy or sulphophenoxy groups; 2-chlorobenzothiazole-5- or -6-carbonyl or -5- or -6-sulphonyl, 2-arylsulphonyl- or -alkylsulphonyl-benzothiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonyl-benzothiazole-5- or -6-sulphonyl or -carbonyl and the corresponding 2-sulphonylbenzothiazole-5- or -6-carbonyl or -sulphonyl derivatives containing sulpho groups in the fused benzene ring, 2-chlorobenzoxazole-5- or -6-carbonyl or sulphonyl, 2-chlorobenzimidazole-5- or -6-carbonyl or sulphonyl, 2-chloro-1-methylbenzimidazole-5- or -6-carbonyl or -sulphonyl, 2-chloro-4-methylthiazole-(1,3)-5-carbonyl or -4- or -5-sulphonyl, N-oxide of 4-chloro- or 4-nitroquinoline-5-carbonyl.

Suitable radicals of carbonic and carbonic acid derivatives, which may be present as acyl radicals $R_1$ are, for example, those of the formulae

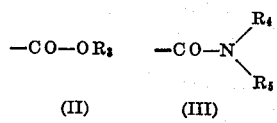

in which $R_3$ denotes an optionally substituted lower alkyl radical or an optionally substituted aryl or aralkyl radical, and $R_4$ and $R_5$, independently of one another, denote hydrogen, optionally substituted lower alkyl radicals or optionally substituted aryl or aralkyl radicals.

Examples of substituents of the radical $R_3$ are halogen atoms, such as fluorine, chlorine or bromine; nitro, cyano and hydroxyl groups; alkoxy groups, with preferably 1–4 carbon atoms; as well as the phenoxy radical. Suitable substituents for the radicals $R_4$ and $R_5$ are, for example, alkyl radicals with 1–4 carbon atoms; carboxylic acid and sulphonic acid groups and their esters; lower alkylsulphonyl groups; arylsulphonyl groups; the trifluoromethyl radical; and the atoms or radicals mentioned as substituents for the radical $R_3$.

The radicals are introduced into the products by using the halides from which these acyl radicals are derived, especially the chlorides of the said acyl radicals $R_1$, as acylating agents.

The new aminonaphthalene-disulphonic acids (I) are obtained by nitrating 2-acylaminonaphthalene-1,5-disulphonic acids in sulphuric acid at low temperatures, preferably at temperatures from —10° C. to about +30° C., to form 2-acylamino-8-nitronaphthalene-1,5-disulphonic acids and optionally hydrolysing these to form 2-amino- 8-nitronaphthalene-1,5-disulphonic acid. In this way there are obtained the compounds according to the invention which correspond to the formula

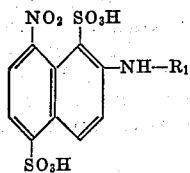

(IV)

in which $R_1$ stands for hydrogen or an acyl radical, preferably acetyl, chloroacetyl, benzoyl and oxaloyl.

These compounds can be reduced in known manner to give the 8-amino compounds according to the invention which correspond to the formula

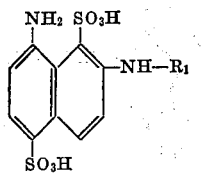

(V)

in which $R_1$ has the same meaning as above.

The compounds according to the invention which correspond to the formula

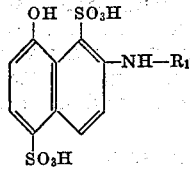

(VI)

in which $R_1$ has the same meaning as above, can be obtained therefrom by converting in the compounds of the Formula V the amino group in the 8-position in known manner into a hydroxyl group.

The 2-amino-8-hydroxy- or -amino- or -nitronaphthalene-1,5-disulphonic acids (VI, $R_1=H$) can be converted by condensation with any acylating agent into compounds of the Formula I in which $R_1$ represents an acyl radical.

For the nitration of 2-acylaminonaphthalene-1,5-disulphonic acid, sulphuric acid with a content of 80–100% is particularly suitable. In detail, the nitration is carried out by introducing the 2-acylaminonaphthalene-1,5-disulphonic acids into sulphuric acid at about 0° C. and reacting at this temperature with a nitrating agent, for example, a mixture of 33% nitric acid and 67% sulphuric acid or with alkali metal nitrates. The reaction is completed within a few hours; towards the end of the reaction, the temperature is slowly raised to about 20° C. Isolation of the 2-acylamino-8-nitronaphthalene - 1,5 - disulphinic acids (IV) can be carried out by pouring the reaction mixture onto ice salting out with sodium or potassium chloride and filtering off.

The 2-amino-8-nitronaphthalene-1,5-disulphonic acid can be obtained from the reaction product by alkaline hydrolysis of the acylamino group.

The reduction of 2-acylamino-8-nitronaphthalene-1,5-disulphonic acids or of 2-amino-nitronaphthalene-disulphonic acid to form the 2-acylamino-8-aminonaphthalene-1,5-disulphonic acids and 2-amino-8-aminonaphthalene-1,5-disulphonic acid, respectively, can be carried out in the usual way, for example, with the aid of catalytically excited hydrogen, iron/acetic acid, zinc/hydrochloric acid, alkali metal sulphides or alkali metal sulphites.

The new 2-amino- or 2-acylamino-8-hydroxynaphthalene-1,5-disulphonic acids can be obtained from the resultant 2-acylamino-8-aminonaphthalene-1,5-disulphonic acids or 2-amino-8-aminonaphthalene - 1,5 - disulphinic acids by a reaction according to Bucherer, i.e. by the reaction with alkali metal bisulphites at elevated temperatures, or by boiling down the diazonium compounds obtainable by diazotization of 2-acylamino-8-aminonaphthalene-1,5-disulphonic acids, via the sultones (VII):

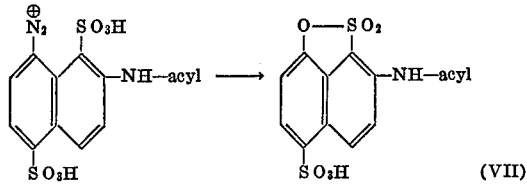

(VII)

(in these formulae "acyl" stands for an acyl radical, preferably acetyl, chloroacetyl, benzoyl or oxaloyl).

If the boiling down is carried out in a more strongly acidic medium, then 2-aminonaphthosultone-sulphonic acid is immediately formed.

The sultone (VII) can be split in an alkaline medium and in the cold to give 2-acylamino-8-hydroxynaphthalene-1,5-disulphonic acid (VI, $R_1$=acyl), whereas heating leads to the formation of the free 2-amino-8-naphthol-1,5-disulphonic acid (VI, $R_1$=H) with simultaneous hydrolysis.

The aminonaphthalene-sulphonic acid derivatives of the Formula I are new compounds which are eminently suitable for the production of azo dyestuffs by diazotizing them at the amino group and combining with coupling components.

In the following examples the parts by weight and the parts by volume are in the ratio of kilograms to litres; the temperatures are given in degrees centigrade.

EXAMPLE 1

30.3 parts by weight 2-naphthylamino-1,5-disulphonic acid (0.1 mol) in the form of the sodium salt are stirred in 50 parts by volume of water, the suspension is acidified with 1.5 parts by volume acetic acid and acetylated by the addition of about 38 parts by volume acetic acid anhydride. The temperature rises to about 30–35°. When the reaction is completed, the reaction mixture is mixed with 75 parts by volume of a saturated sodium chloride solution and the precipitation of the acetyl product is completed by the addition of 130 g. sodium chloride. The sodium salt 2-acetylaminonaphthalene-1,5-disulphonic acid is then isolated and dried at 75° in a vacuum. Yield: 31 parts by weight=90% of theory.

35 parts by weight 2-acetylaminonaphthalene-1,5-disulphonic acid are introduced at −5 to 0° into 240 parts by volume of pure concentrated sulphuric acid. 13.8 parts by volume of mixed acid (33% $HNO_3$, 67% $H_2SO_4$) are then slowly added dropwise with good stirring.

When the addition is completed, the temperature of the reaction mixture is raised to 15° within one hour, the yellow-brown solution is subsequently poured on to about 1000 parts by weight of ice, the 2-acetylamino-8-nitronaphthalene-1,5-disulphonic acid is precipitated from the resulting solution by the addition of 60 parts by weight sodium chloride and 60 parts by weight potassium chloride, and subsequently isolated.

Yield: 28.5 parts by weight (80% yield).

$R_f$-values: 0.63 (butyl acetate:pyridine:water=2:3:2) and 0.64 (ethylacetate:pyridine:water=11:5:4); ascending; using paper No. 2043b Mgl of the firm Schleicher & Schüll.

EXAMPLE 2

39 parts by weight 2-acetylamino-8-nitronaphthalene-1,5-disulphonic acid are dissolved in 150 parts by volume of water and 70 parts by volume of a 40% sodium hydroxide solution, and the solution is heated at 90–95% for 15 minutes.

The mixture is then cooled, the hydrolysation solution is carefully acidified with 50 parts by volume hydrochloric acid, the nitroamino-naphthalene-disulphonic acid of the formula

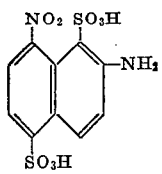

is precipitated by the addition of 50 parts by weight potassium chloride and subsequently isolated.

$R_f$-values: 0.50 (butyl acetate:pyridine:water=2:3:2) and 0.38 (ethylacetate:pyridine:water=11:5:4); ascending; using paper No. 2043b Mgl of the firm Schleicher & Schüll.

EXAMPLE 3

28:5 parts by weight 2-acetylamino-8-nitronaphthalene-1,5-disulphonic acid are dissolved neutral in 600 parts by volume of water and reduced at 30–35° under hydrogen pressure with the use of Raney nickel as catalyst. A slightly coloured clear solution is formed which is filtered off from the Raney nickel; the reduction product is subsequently precipitated by the addition of 160 parts by weight sodium chloride and 15 parts by volume hydrochloric acid, and finally isolated. 25 parts by weight (80% of theory) 2-acetyl-amino-8-aminonaphthalene-1,5-disulphonic acid are obtained.

$R_f$-value: 0.54 (butyl acetate:pyridine:water=2:3:2) and 0.44 (ethyl acetate:pyridine:water=11:5:4); ascending; using paper No. 2043b Mgl of the firm Schleicher & Schüll.

EXAMPLE 4

36 parts by weight 2-acetylamino-8-aminonaphthalene-1,5-disulphonic acid are dissolved in 150 parts by volume of water containing 50 parts by volume of a 40% sodium hydroxide solution, and this solution is heated at boiling temperature for 30 minutes. The solution is then cooled, acidified with 75 parts by volume hydrochloric acid, the 2,8-diaminonaphthalene-1,5-disulphonic acid is precipitated with 25 parts by weight sodium chloride and can then be isolated by filtration.

The Na salt of this acid is readily soluble in water and has a green fluorescence under ultraviolet irradiation.

$R_f$-values: 0.35 (butyl acetate:pyridine:water=2:3:2) and 0.20 (ethyl acetate:pyridine:water=11:5:4); ascending; using paper No. 2043b Mgl of the firm Schleicher & Schüll.

EXAMPLE 5

31.8 parts by weight (0.1 mol) 2,8-diaminonaphthalene-1,5-disulphonic acid in the form of the sodium salt are dissolved in 500 parts by volume of water and the solution is mixed at a temperature of 40–50° with 33 parts by weight 3,5-bis-naphthylsulphonyl-isothiazole-4-carboxylic acid chloride. The hydrochloric acid liberated in the condensation of the acid chloride with the diaminonaphthalene-disulphonic acid is neutralised by the dropwise addition of a 20% sodium carbonate solution. When the condensation is completed, a slight precipitate is filtered off, the compound of the formula

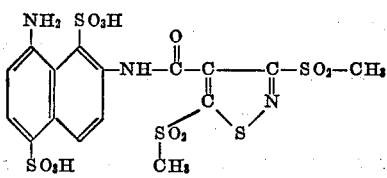

is separated from the filtrate by acidification up to pH 4, and subsequently isolated.

The Na salt of this acid is readily soluble in water and has a green fluorescence under ultraviolet irradiation.

EXAMPLE 6

36 parts by weight 2-acetylamino-8-aminonaphthalene-1,5-disulphonic acid are dissolved neutral in 200 parts by volume of water, the solution is then acidified with 28 parts by volume hydrochloric acid and immediately diazotized by the addition of 24 parts by volume of a 30% sodium nitrite solution. When the diazotization is completed, the diazonium compound is precipitated by the addition of 60 parts by weight potassium chloride and isolated.

The diazonium compound so obtained is introduced as a paste in portions into 200 parts by volume of boiling water. When the addition is completed, heating is continued for 15 minutes, the reaction mixture is then cooled, the sultone of the formula

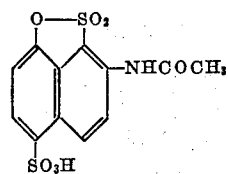

is precipitated by the addition of 30 parts by weight sodium chloride and subsequently isolated.

The paste so obtained is stirred in 100 parts by volume of water, 20 parts by volume of a 40% sodium hydroxide solution are added and the mixture is stirred at 15–20° for 10 minutes. The mixture is then acidified with 40 parts by volume hydrochloric acid and the precipitated acetaminonaphtholdisulphonic acid of the formula

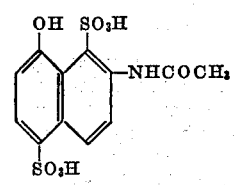

is isolated.

The Na salt of this acid is readily soluble in water and has a green fluorescence under ultraviolet irradiation.

$R_f$-values: 0.67 (butyl acetate:pyridine:water=2:3:2) and 0.76 (ethyl acetate:pyridine:water=11:5:4); ascending; using paper No. 2043b Mgl of the firm Schleicher & Schüll.

If a solution of 2-acetamino-1,8-sultone-naphthalene-5-sulphonic acid in 100 parts by volume of water and 20 parts by volume of a sodium hydroxide solution is heated with stirring at about 90–95° for 30 minutes, then cooled and acidified with 40 parts by volume hydrochloric acid, then the free amino-naphthol-disulphonic acid of the formula

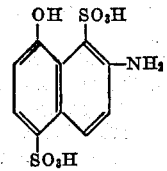

is obtained.

The Na salt of this acid is readily soluble in water and has a green fluorescence under ultraviolet irradiation.

$R_f$-values: 0.74 (butyl acetate:pyridine:water=2:3:2) and 0.85 (ethyl acetate:pyridine:water=11:5:4); ascending; using paper No. 2043b Mgl of the firm Schleicher & Schüll.

EXAMPLE 7

36 parts by weight 2-acetylamino-8-aminonaphthalene-1,5-disulphonic acid are stirred with 95 parts by volume of a 40% sodium bisulphite solution and the mixture is heated at boiling temperature for 2 hours. A clear solution is formed after about 15–20 minutes. The reaction mixture is subsequently mixed with 50 parts by volume of a 40% sodium hydroxide solution and stirred for 30 minutes. It is then acidified at about 40–50° by the addition of 100 parts by volume of concentrated hydrochloric acid, and the reaction product of the formula

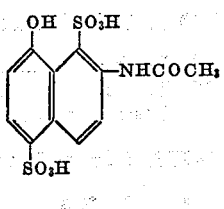

is completely precipitated by the addition of 60 parts by weight potassium chloride.

The Na salt of this acid is readily soluble in water and has a green fluorescence under ultraviolet irradiation.

$R_f$-values: 0.67 (butyl acetate: pyridine:water=2:3:2) and 0.76 (ethyl acetate:pyridine:water=11:5:4); ascending; using paper No. 2043b Mgl of the firm Schleicher & Schüll.

EXAMPLE 8

32 parts by weight 2-amino-8-hydroxynaphthalene-1,5-disulphonic acid are dissolved at pH 6 in 300 parts by volume of water and the solution is mixed at 30–35° in portions with 30 parts by weight 2,3-dichloroquinoxaline-6-carboxylic acid chloride. The liberated hydrochloric acid is neutralised by the dropwise addition of a sodium carbonate solution. The precipitation of the acylation product is completed by the addition of 60 parts by weight sodium chloride, and the resultant compound of the formula

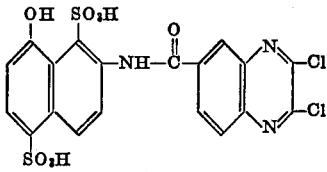

is subsequently isolated.

The Na salt of this acid is readily soluble in water and has a green fluorescence under ultraviolet irradiation.

When the condensation reaction of 2-amino-8-hydroxynaphthalene-1,5-disulphonic acid is performed with a suspension of 18.5 parts by weight cyanuric acid chloride in ice water/acetone at 0–5° C. there is obtained, after separation of the condensation product with potassium chloride, the compound of the formula

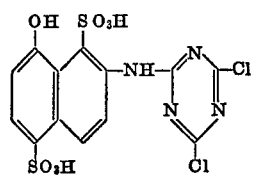

The Na salt of this acid is readily soluble in water and has a green fluorescence under ultraviolet irradiation.

By heating at 70–80° C. equimolar amounts of 2-amino-8 - hydroxynaphthalene - 1,5 - disulphonic acid and tetrachloropyrimidine at pH 6 until free amino-compound is no longer detectable there is obtained the compound of the formula

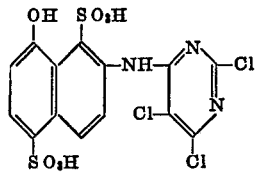

The Na salt of this acid is readily soluble in water and has a green fluorescence under ultraviolet irradiation.

EXAMPLE 9

By coupling the diazonium compound obtainable from 2 - amino - 8-nitronaphthalene-1,5-disulphonic acid (Example 2) with 1 - (3' - sulphophenyl)-3-methyl-5-aminopyrazole in an aqueous medium at pH 5 there is obtained the dyestuff of the formula

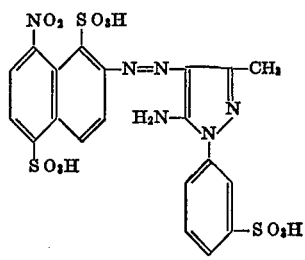

which dyes wool in clear yellow shades.

EXAMPLE 10

36 parts by weight 2-acetylamino-8-aminonaphthalene-1,5-disulphonic acid in the form of the sodium salt are dissolved in 800 parts by volume of water, the solution is acidified by the addition of 28 parts by volume of concentrated hydrochloric acid and immediately diazotized with a solution of 6.9 parts by weight sodium nitrite in 50 parts by volume of water. The resultant solution of the diazonium salt is added to a solution of 0.1 mol 1-hydroxynaphthalene-4-sulphonic acid in 150 parts by volume of a 20% sodium carbonate solution. Coupling sets in immediately, and after its completion the dyestuff of the formula

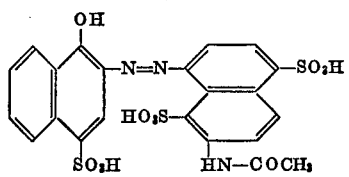

is precipitated by the addition of 200 parts by weight sodium chloride and isolated. When dried, the dystuff is a red powder which dyes wool in yellowish red shades.

EXAMPLE 11

31.9 parts by weight (0.1 mol) 2-amino-8-hydroxynaphthalene-1,5-disulphonic acid in the form of the sodium salt are dissolved in 600 parts by volume of water, the solution is mixed with 150 parts by volume of a 20% sodium carbonate solution and subsequently coupled by the addition of 0.1 mol benzene-diazonium chloride in 100 parts by volume of water to form the azo dyestuff of the formula

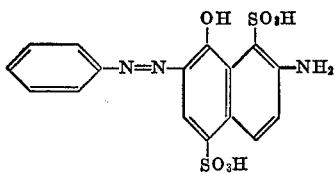

When the coupling is completed, the dyestuff is precipitated by the addition of 70 parts by weight sodium chloride and subsequently isolated. After drying, it is a red powder which dissolves in water with a red colour and dyes wool in red shades.

What is claimed is:

1. Aminonaphthalene-sulphonic acid of the formula

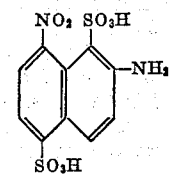

References Cited
UNITED STATES PATENTS

| | | | |
|---|---|---|---|
| 3,350,441 | 10/1967 | Leightle | 260—508 |
| 2,036,661 | 4/1936 | Tinker | 260—508 X |
| 2,945,022 | 7/1960 | Fasciati et al. | 260—508 X |

DANIEL D. HORWITZ, Primary Examiner

U.S. Cl. X.R.

260—150, 141, 194, 196, 241, 243, 247.1, 248 NS, 249.5, 250 R, 251 R, 256.5 R, 295 K, 295.5 A, 302 R, 304, 307 R, 287 R, 310 R, 332.3 R, 327 S, 347.2, 401, 509, 510